United States Patent [19]

Baurecht et al.

[11] 4,102,892

[45] Jul. 25, 1978

[54] PROCESS FOR THE PREPARATION OF COPPER PHTHYLOCYANINE

[75] Inventors: Heinz-Ewald Baurecht; Reinhold Hörnle, both of Cologne, Germany

[73] Assignee: Bayer Aktiengesellschaft, Leverkusen, Germany

[21] Appl. No.: 778,117

[22] Filed: Mar. 16, 1977

[30] Foreign Application Priority Data

Mar. 18, 1976 [DE] Fed. Rep. of Germany ....... 2611545

[51] Int. Cl.² ............................................. C09B 47/06
[52] U.S. Cl. ................................................. 260/314.5
[58] Field of Search ..................................... 260/314.5

[56] References Cited

FOREIGN PATENT DOCUMENTS 2,432,564  1/1976  Fed. Rep. of Germany .... 260/314.5

*Primary Examiner*—John M. Ford
*Attorney, Agent, or Firm*—Plumley and Tyner

[57] ABSTRACT

The chemical yield and the space-time yield of copper phthalocyanine obtained according to the "baking process" is improved if urea and phthalic anhydride, or its reaction products with ammonia, or the dehydration products thereof, are fed in the liquid form to the reaction vessel.

4 Claims, No Drawings

PROCESS FOR THE PREPARATION OF COPPER PHTHYLOCYANINE

An important process for the preparation of copper phthalocyanine consists in reacting phthalic anhydride, or its reaction products with ammonia, or the dehydration products thereof, with urea, a copper salt and a catalyst, for example a molybdenum compound. This process can be carried out free from solvent, as a so-called "baking process", or can be carried out in inert solvents. It is known from German Offenlegungsschrift (German Published Specification) No. 2,432,564 that, in the case of the solvent-free process, disadvantages, such as those which have formerly arisen, can be avoided by carrying out the baking process in a reactor which has the following characteristics: (a) self-cleaning of at least 75%, and preferably at least 85%, of the heated surfaces; (b) an effective volume of at least 40%, and preferably at least 50%, of the total volume of the reactor, the effective volume being at least 10 l; and (c) a possibility for heating inside the reactor with a heating surface of at least 34% of the heatable internal surface area of the housing.

The residence time for the process carried out in this way is between 5 minutes and 5 hours and preferably between 5 and 45 minutes. With this process the yields are 75 to 83%, depending on the throughput and the higher yields have been achieved with smaller throughputs.

It has now been found, surprisingly, that it is possible to improve this process with, at the same time, an increase in the space-time yield and an increase in the chemical yield.

The subject of the invention is, accordingly, a process for the preparation of copper phthalocyanine from phthalic anhydride, its reaction products with ammonia, or the dehydration products thereof, urea, a copper salt and a catalyst by the baking process, characterised in that the urea and the phthalic anhydride, or its reaction product with ammonia, or the dehydration products thereof, are fed in the liquid form to the reaction vessel. The copper salt and the catalyst can be added to one of the two liquid components or can be added as solids, before or during the reaction, to the reaction vessel; preferably, the copper salt and the catalyst are dissolved in the urea melt.

The process according to the invention can be used for all the preparations of copper phthalocyanine by the baking process. However, it is particularly advantageous as an auxiliary process to the process proposed in German Offenlegungsschrift (German Published Specification) 2,432,564.

Derivatives of phthalic anhydride which can be used are diammonium phthalate, phthalimide, phthalic acid diamide, amino-imino-isoindolinine, 1-amino-3-oxo-isoindolinine and phthalic acid dinitrile as well as the corresponding phthalic acid compounds which are substituted in the nucleus and in which the benzene radical are substituted by halogen, such as chlorine or bromine, $C_1$–$C_4$-alkyl, such as methyl and ethyl, phenyl, $C_1$–$C_4$-alkoxy, such as methoxy and ethoxy, and sulpho. Preferably, phthalic anhydride and mixtures of phthalic anhydride and 4-cholorophthalic acid are used.

Examples of suitable copper salts are copper sulphate, copper chloride and basic copper carbonate. The latter is preferred.

Catalysts which can be used those mentioned in F. H. Moser and A. L. Thomas, Phthalocyanin Compounds, Reinhold Publ. Corp. (1963), page 151 and amongst these ammonium molybdate and molybdenum trioxide are preferred.

The components phthalic acid, urea and the copper salt are appropriately employed in molar ratios of 4:(6 to 30):(0.8 to 2) and peferably 4:(10 to 20):(0.9 to 1.2). The amount of catalyst is 0.01 to 5 per cent by weight, preferably 0.1 to 0.6 percent by weight, relative to the amount of the phthalic acid derivative.

Whilst the improvement in the space-time yield in the reactor is in itself understandable as a result of the melting time being omitted, it is distinctly surprising that the chemical yield is also increased, since it is generally known that urea melts decompose readily and that, for this reason, a reduced yield would, in itself, have to be expected.

EXAMPLE 7.6 kg/hour of a phthalic anhydride melt at 240° C and 14.9 kg/hour of a solution of 6 parts of $MoO_3$ and 185 parts of $CuSO_4.H_2O$ in 960 parts of a urea melt at 140° C are fed to an 18 l AP-Conti reactor from Messrs. List, Pratteln, Switzerland. The reactor is so heated that the temperature of the reaction melt reaches about 240° C in the final third of the reactor.

Analysis of the crude pigment gives a throughput of 6.3 kg of 100% strength Cu phthalocyanine/hour, which corresponds to a yield of 85% of theory. If the reactants are metered in in the solid form, a yield of only 76% of theory is obtained with the abovementioned throughput and this can be increased to 83% of theory by doubling the residence time.

We claim:

1. In the process for the preparation of copper phthalocyanine from (a) phthalic anhydride, its reaction products with ammonia or the dehydration products thereof, (b) urea, (c) a copper salt and (d) a catalyst by the baking process; the improvement which comprises feeding components (a) and (b) separately in liquid form to the reaction vessel.

2. Process according to claim 1, characterised in that the copper salt is dissolved in molten urea.

3. Process according to claim 1, characterised in that the reaction vessel used is a reactor which has the following characteristics: (a) self-cleaning of at least 75% of the heated surfaces; (b) an effective volume of at least 40% of the total volume of the reactor, the effective volume being at least 10 l; and (c) a possibility for heating inside the reactor with a heating surface of at least 34% of the heatable internal surface area of the housing.

4. Process according to claim 1, characterised in that the phthalic anhydride, or the phthalic anhydride derivative, urea and the copper salt are employed in a molar ratio of 4:(6 to 30):(0.8 to 2) and the catalyst is employed in an amount of 0.1 to 5 percent by weight, relative to the amount of the phthalic acid derivative.

* * * * *